April 30, 1940.   H. J. BLAKESLEE   2,199,022
ELECTRICAL CONNECTION MEANS
Filed Sept. 29, 1938
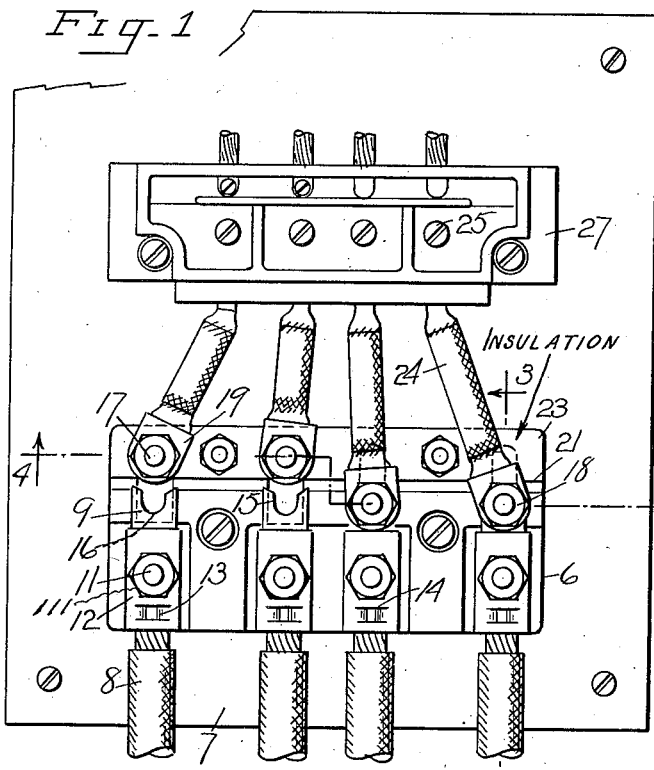
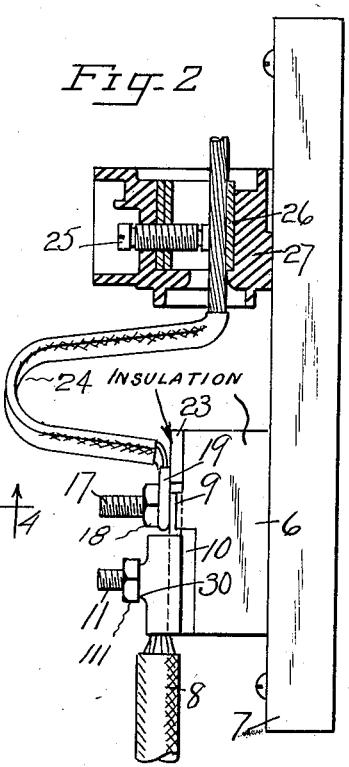
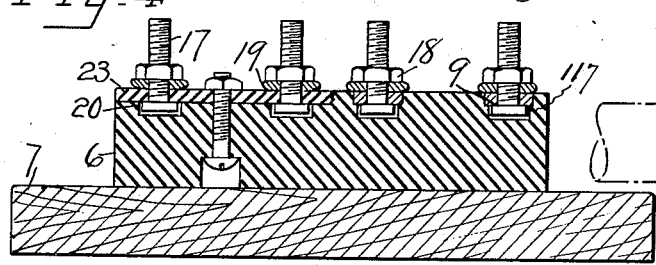
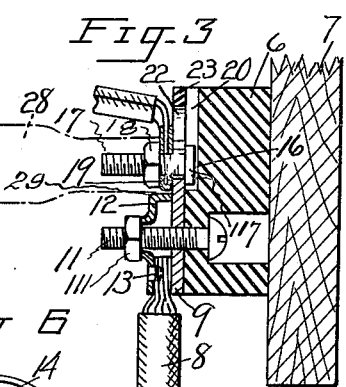
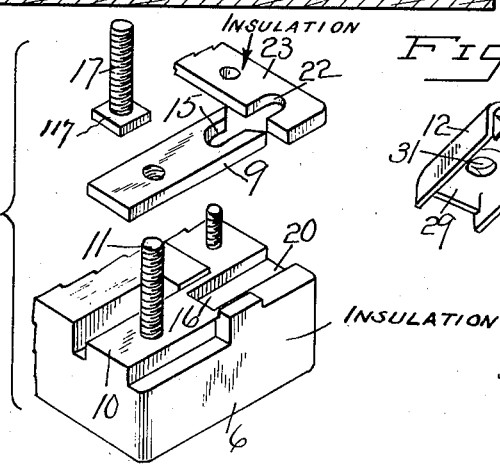
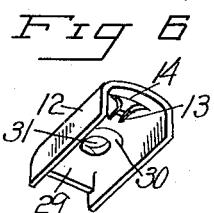
INVENTOR
Henry J. Blakeslee
BY Harry P. Williams
atty.

Patented Apr. 30, 1940

2,199,022

UNITED STATES PATENT OFFICE 2,199,022

ELECTRICAL CONNECTION MEANS

Henry J. Blakeslee, Marlboro, Conn., assignor to The States Company, Hartford, Conn., a corporation of Connecticut Application September 29, 1938, Serial No. 232,310

6 Claims. (Cl. 200—163)

This invention relates to means which are interposed between the terminals of electric line circuits and meters that are associated therewith for measuring loads on the circuits, and more particularly to such means as are arranged to facilitate testing of the meters.

The previous general practice has been to furnish a block of some insulating material with pairs of spaced plates or other form of conductors fixed thereto, one of each pair of such conductors having means for the attachment of line terminals and the other of each pair having means for the attachment of meter terminals, and arranging movable means that can be set to bridge the spaces between the contiguous conductors and close the circuit paths, or moved to disconnect the conductors and be set with the circuit paths open.

The object of the present invention is to provide relatively cheap and easily assembled means of such design and arrangement that the circuit paths from the line conductors to a meter can be efficiently closed with a minimum of contact joints and the circuit paths can be quickly opened and secured in safe open position with a visual showing of the conditions of the paths.

This object is attained in the embodiment of the invention illustrated by fixedly mounting on an insulating block one conductor plate and means for clamping a line terminal thereto, for each circuit path, and providing an end of each meter terminal with a conducting clamp that is movably engaged with the block and is adapted in one position to clamp the meter terminal to a conductor plate and in another position to clamp the meter terminal to the block, spaced from the plate, whereby in each current path when closed there are but two detachable contact joints—one between a line terminal and the fixed conductor plate, and the other between a meter terminal and the fixed conductor plate.

In the accompanying drawing Fig. 1 is a front view of means that embodies the present invention, the connector block having four current paths, two of which are closed and two opened, and the meter leads being connected to a meter block.

Fig. 2 is a side view of the connector block with the meter block shown in section.

Fig. 3 is a cross section through the connector block on plane denoted by the dotted line 3—3 on Fig. 1.

Fig. 4 is a section through the connector block on plane denoted by the dotted line 4—4 on Fig. 1.

Fig. 5 is a perspective view of elements of the connector block separated in order to more clearly illustrate their shapes and relations.

Fig. 6 is a view showing a construction of a preferred form of line terminal clamp.

The block 6 of insulating material may have any desired number of current paths, four being illustrated, and it has means whereby it may be secured to any suitable support 7. On the face of the block in each current path is a conducting plate 9 that is held in place by a screw 11. To the outer end of this plate the terminal of a line wire or cable 8 may be tightly secured by a clamp 12 that is bound by a nut 111 on screw 11 which passes through a perforation 31 in the top of the clamp. The clamp is desirably trough shaped so as to span the terminal and also span a rib 10 on the block. The perforation 31 in the clamp is somewhat larger in diameter than the screw 11, and around this the clamp is slightly domed, as at 30, so as to permit it to tip lengthwise and adjust itself to terminals of different sizes without strain on the screw. At the inner end of the clamp there is a cross web 29 which bears against the conductor plate 9 and limits the amount of lengthwise tip of the clamp when the binding nut is turned down. Indentations 14 are made in the top of the clamp plate to form spurs 13 which will project between the strands of a cable line conductor to increase the hold of the clamp on the terminals.

The inner end of the fixed conductor plate 9 is forked and in the block under the fork is a cavity 16 which is somewhat wider than the width of the opening in the fork. Extending across and fastened to the top of the block 6 opposite the forked ends of the plates 9 is a strip 23 of insulating material. This strip has notches 22 in its edge opposite the forked ends of the plates 9, the fork openings and the strip notches being of substantially the same width and in the same plane. Below the notches in the strip 23 and forming a continuation of the cavity 16 is a cavity 20.

The meter leads 24, whether braided, stranded or solid, are more or less flexible. The upper ends of the leads may be attached to the meter block 27 by the usual means, the means shown being conducting sockets 26 in the meter block and binding screws 25. The lower ends of the meter leads are tipped with conducting clips 19. Through the clips pass screws 17 that have heads 117 at their inner ends and binding nuts 18 threaded on their outer ends. The bodies of the screws 17 are sized to pass into and out of the forked openings in the plates 9 and notches in the strip 23, while the heads of the screws are fitted to slide back and forth in the cavities 16 below the forks and cavities 20 below the notches without being removable therefrom.

When these elements are assembled for use the nuts 18 may be loosened preferably by a socket wrench 28, and the terminals slid by the wrench either into the forks 15 of the plates 9 and then tightened to close the current paths, or slid into the notches 22 in the strip 23 and tightened to hold the circuits open, depending upon the condition of circuits desired.

With the arrangement illustrated the circuits may be opened or closed by moving the terminals of the meter leads out of or into engagement with the conductor plates to which the line conductors are connected. This is effected by manipulating the terminal binding means and without the provision of any intermediate movable bridging conductors and without disconnecting the meter leads from the block. Testing instruments may be connected directly to the meter leads by attaching the instrument leads to the means employed for clamping the meter leads in open and closed positions.

The invention claimed is:

1. Electrical testing means designed to be interposed between line terminals and a meter, which comprises a block of insulation having a channel below its face near one edge with insulation covering a portion of said channel, a conducting member fixedly mounted on said block with an end extending over said channel in the plane of and spaced a short distance from the edge of said insulation channel covering, means for attaching a line terminal to said conducting member, a flexible conductor that is longer than the distance between said fixed conducting member and the meter and has an end adapted to be connected to the meter and an end movable into and out of contact with said conducting member, and clamping means swively attached to and movable with said flexible conductor end longitudinally of said channel between said insulation channel covering and the adjacent end of said conducting member, said clamping means when tightened in one position clamping said flexible conductor end in direct contact with the fixed conducting member and when tightened in another position clamping said flexible conductor end in engagement with said insulation channel covering.

2. Electrical testing means designed to be interposed between line terminals and a meter, which comprises a block of insulation, a conducting member fixedly mounted on said block, means for attaching a line terminal to said conducting member, a flexible conductor that is longer than the distance between said fixed conducting member and the meter and has an end adapted to be connected to the meter and an end movably attached to said block, said latter end being movable into and out of contact with said conducting member, and clamping means swively attached to and movable with said flexible conductor end and adapted when loosened to be utilized for moving said flexible conductor end into and out of engagement with said fixed conducting member, said clamping means when tightened in one position clamping said flexible conductor end directly against the fixed conducting member and when tightened in another position clamping said flexible conductor end directly against the block.

3. Electrical testing means designed to be interposed between line terminals and a meter, which comprises a block of insulation having a channel open to one edge below its front face, said block having a portion over the outer end of said channel which portion has a notch of less width than the width of the channel, aligned with the channel, a conducting member fixedly mounted on said block, said conducting member having an end with a notch of less width than and extending over said channel adjacent to and aligned with the said notched portion of the block, means for attaching a line terminal to said conducting member, a flexible conductor that is longer than the distance between said fixed conducting member and the meter and has an end adapted to be connected to the meter and an end movably attached to said block, said latter end being movable into and out of contact with said conducting member, and a screw and nut attached to and movable along the block lengthwise of said channel from notch to notch with said flexible conductor end, said screw and nut when tightened in one position clamping said flexible conductor end in direct contact with the fixed conducting member and when tightened in another position clamping said flexible conductor end in engagement with the block.

4. Electrical testing means designed to be interposed between line terminals and a meter, comprising a block of insulation having recesses in its front face and a strip of insulating material with notches in its inner edge detachably secured over said recess, conducting members fixedly mounted on said block, said conducting members having forked ends projecting over said recesses and aligned with said notches, flexible conductors having ends adapted to be connected to the meter and ends adapted to be moved into and out of engagement with said conducting members, bolts swivelled to said latter ends, the heads of said bolts being movable back and forth in said recesses and the shanks of said bolts being movable into and out of the notches in said strip of insulation and forked ends of said fixed conductors, and nuts on said bolts adapted to clamp the ends of flexible conductors in one position to the forked ends of the fixed conductors and in another position to said insulating strip.

5. Electrical testing means designed to be interposed between line terminals and a meter comprising a block of insulation having recesses in its front face and a strip of insulating material with notches in its inner edge, detachably secured over said recesses, conducting members fixedly mounted on said block, said conducting members having forked ends projecting over said recesses and aligned with said notches, bolts having heads movable back and forth in said recesses and shanks movable into and out of the notches in said strip of insulation and the forked ends of said fixed conductors, and nuts on said bolts adapted to clamp the bolts when in one position to the forked ends of the fixed conductors and when in another position to said insulating strip.

6. Electrical testing means designed to be interposed between line terminals and a meter which comprises a block of insulating material, a conducting member fixedly mounted on said block, a binding unit consisting of a bolt and nut attached to and movable along said block toward and from said fixed conductor, and a flexible meter lead with one end swivelled to said binding unit and movable therewith whereby said swivelled lead end may be carried by said binding unit into or out of engagement with said fixed conductor and fastened in either position.

HENRY J. BLAKESLEE.